United States Patent
Thanasack et al.

(10) Patent No.: US 6,171,190 B1
(45) Date of Patent: Jan. 9, 2001

(54) PHOTOSENSITIVE INPUT PERIPHERAL DEVICE IN A PERSONAL COMPUTER-BASED VIDEO GAMING PLATFORM

(75) Inventors: Bounchanh Thanasack, Surrey; Minjie Shi, New Westminster, both of (CA)

(73) Assignee: ACT Labs, Ltd., Richmond (CA)

( * ) Notice: Under 35 U.S.C. 154(b), the term of this patent shall be extended for 0 days.

(21) Appl. No.: 09/085,153

(22) Filed: May 27, 1998

(51) Int. Cl.[7] .................................................... A63F 9/02
(52) U.S. Cl. ................................. 463/51; 463/53; 463/5
(58) Field of Search ............................. 463/2, 5, 39, 49, 463/50, 51, 53

(56) References Cited

U.S. PATENT DOCUMENTS

| | | |
|---|---|---|
| 3,793,481 | 2/1974 | Ripley et al. . |
| 3,997,891 | 12/1976 | Iwamura et al. . |
| 4,011,546 | 3/1977 | Kawata et al. . |
| 4,190,831 | 2/1980 | Stahle et al. . |
| 4,205,847 * | 6/1980 | Steiger et al. .......................... 463/5 |
| 4,268,826 | 5/1981 | Scott et al. . |
| 4,367,465 | 1/1983 | Mati et al. . |
| 4,395,045 * | 7/1983 | Baer . |
| 4,620,107 | 10/1986 | Frame . |
| 4,642,459 | 2/1987 | Caswell et al. . |
| 4,675,665 | 6/1987 | Halliwell . |
| 4,677,428 | 6/1987 | Bartholow . |
| 4,813,682 * | 3/1989 | Okada . |
| 5,187,467 | 2/1993 | Myers . |
| 5,310,192 * | 5/1994 | Miyake . |
| 5,351,969 | 10/1994 | Smith, III et al. . |
| 5,401,025 * | 3/1995 | Smith, III et al. ........................ 463/5 |
| 5,859,635 * | 1/1999 | Hang et al. ............................. 345/213 |
| 5,977,802 * | 11/1999 | Cirot et al. .............................. 327/28 |
| 6,012,980 * | 1/2000 | Yoshida ..................................... 463/2 |
| 6,028,571 * | 2/2000 | Eglit ......................................... 345/3 |

FOREIGN PATENT DOCUMENTS

| | | |
|---|---|---|
| 0 550 265 A2 | 7/1993 | (EP) . |
| 2324691A | 10/1998 | (GB) . |
| 2325600A | 11/1998 | (GB) . |
| WO98/17361 | 4/1997 | (WO) . |

* cited by examiner

*Primary Examiner*—Linda Johnson
*Assistant Examiner*—John Paradiso
(74) *Attorney, Agent, or Firm*—Greenberg Traurig, LLP; Anthony R. Barkume

(57) ABSTRACT

A video game system with a light gun video game peripheral device having a photosensitive transducer operating in conjunction with a personal computer platform. The gun-shaped light-sensitive device is connected to a peripheral adapter coupled between the computer and a video monitor. The peripheral adapter captures the horizontal and vertical synchronization signals from the video adapter card in the computer and sends them to the light gun so that processing circuitry therein can generate a peripheral position signal indicative of the position of the field of view of the photosensitive transducer relative to the screen. The video game peripheral device also has means for transmitting the peripheral position signal to the computer means for further processing. This allows a light gun to be used with a conventional personal computer without having to modify the computer with additional circuit boards and operating system changes.

63 Claims, 14 Drawing Sheets

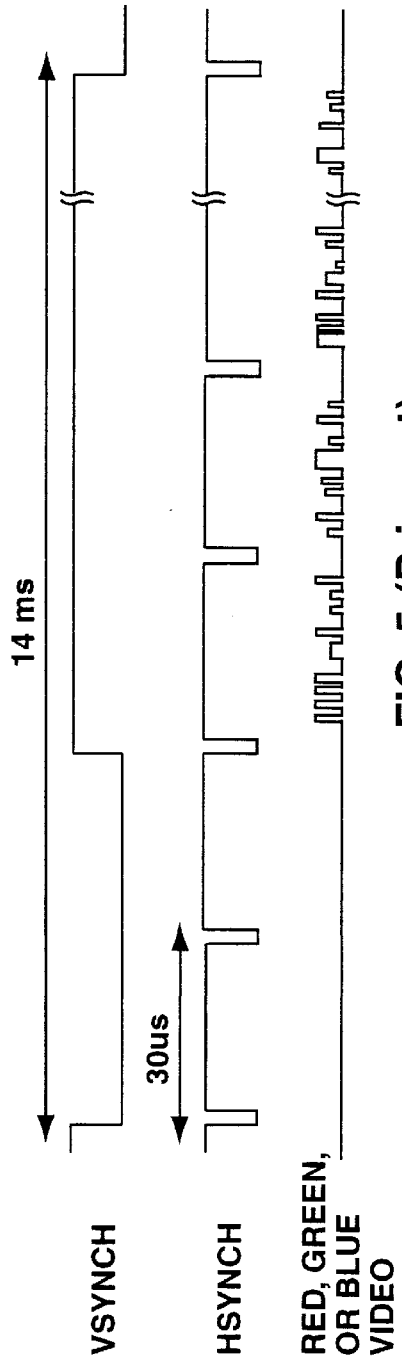
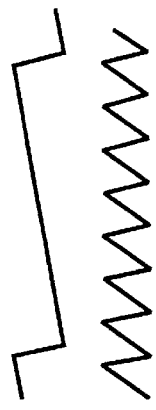
FIG. 5 (Prior art)
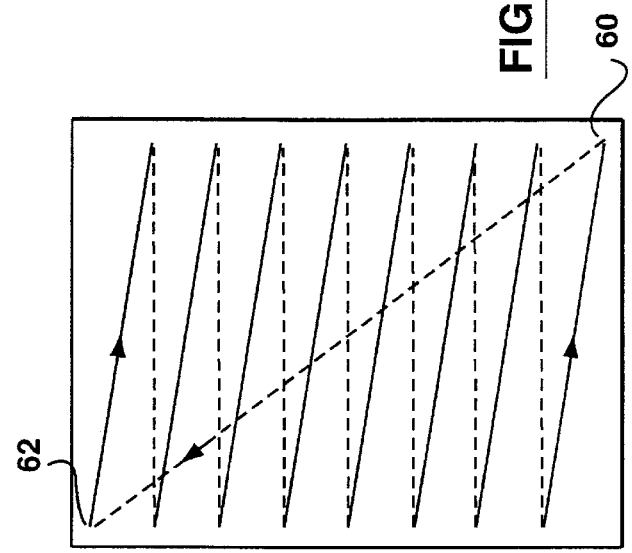
FIG. 6(b) (Prior art)
FIG. 6(a) (Prior art)

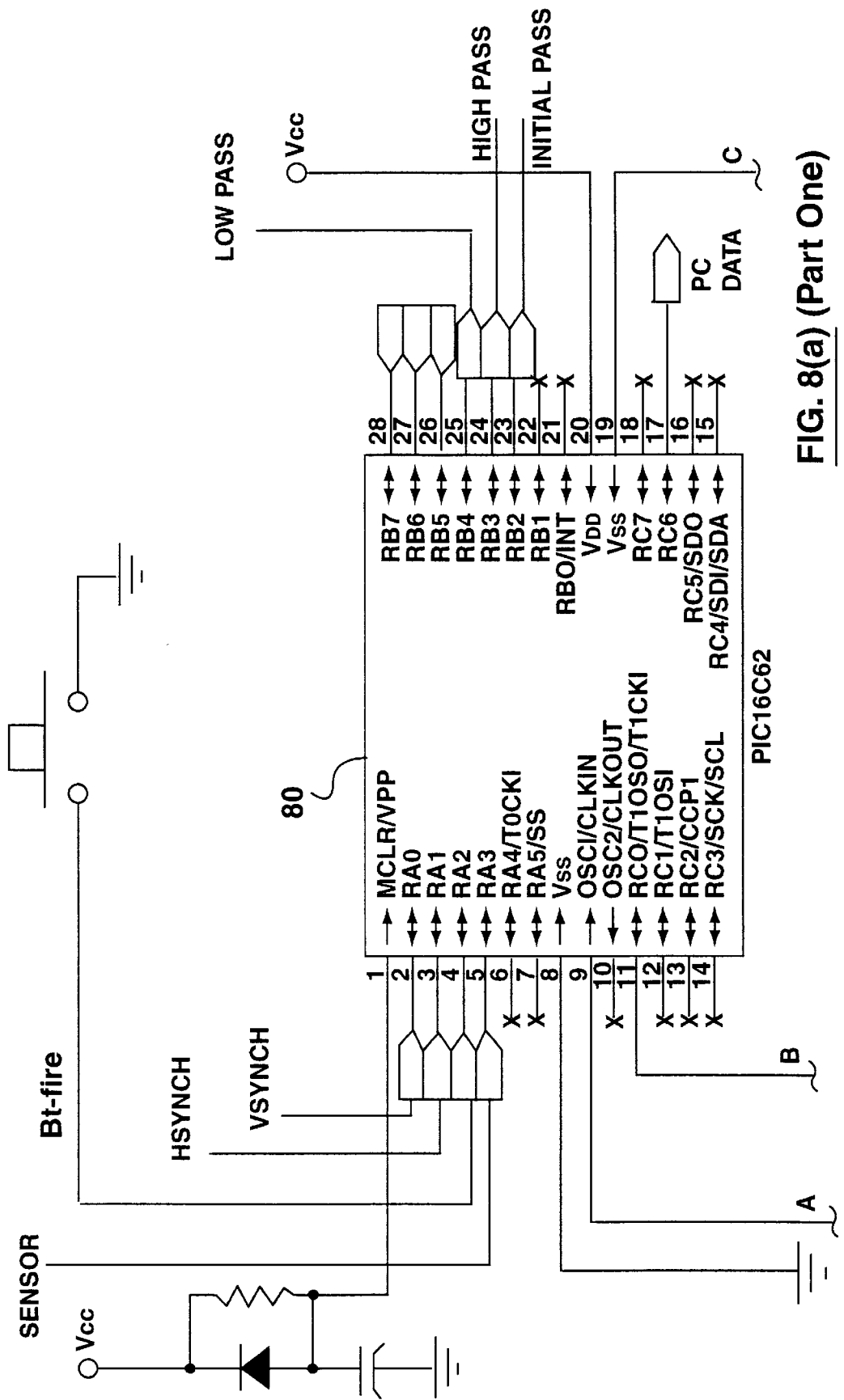
FIG. 8(a) (Part One)

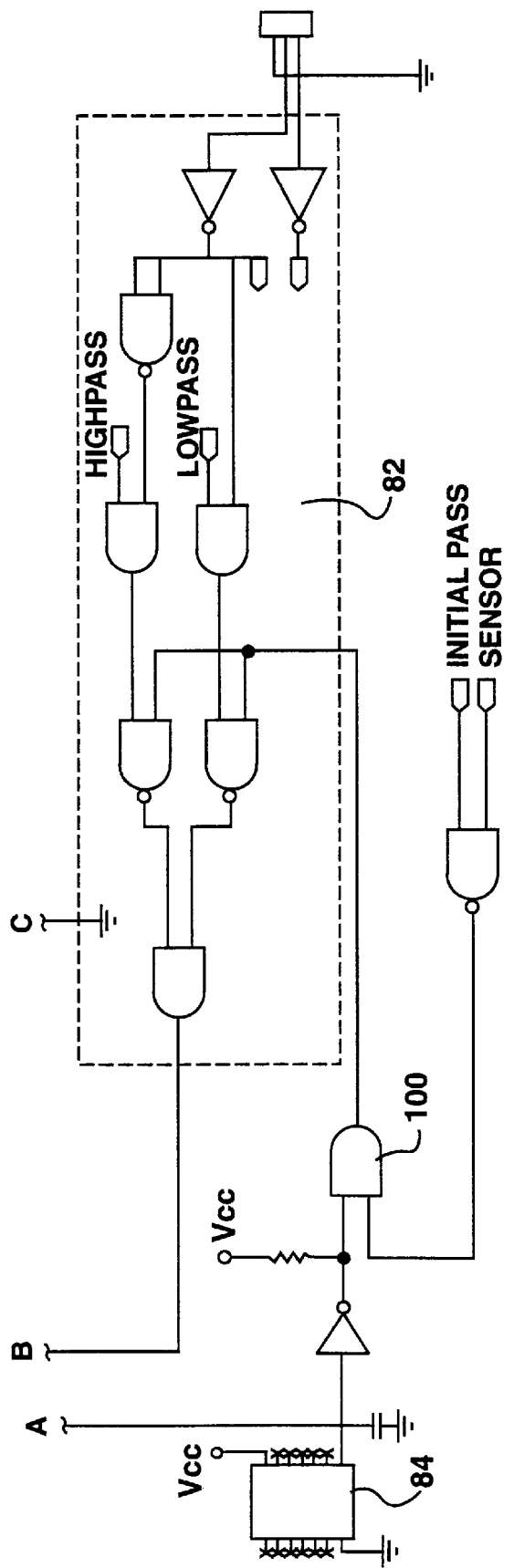
FIG. 8(a) (Part Two)

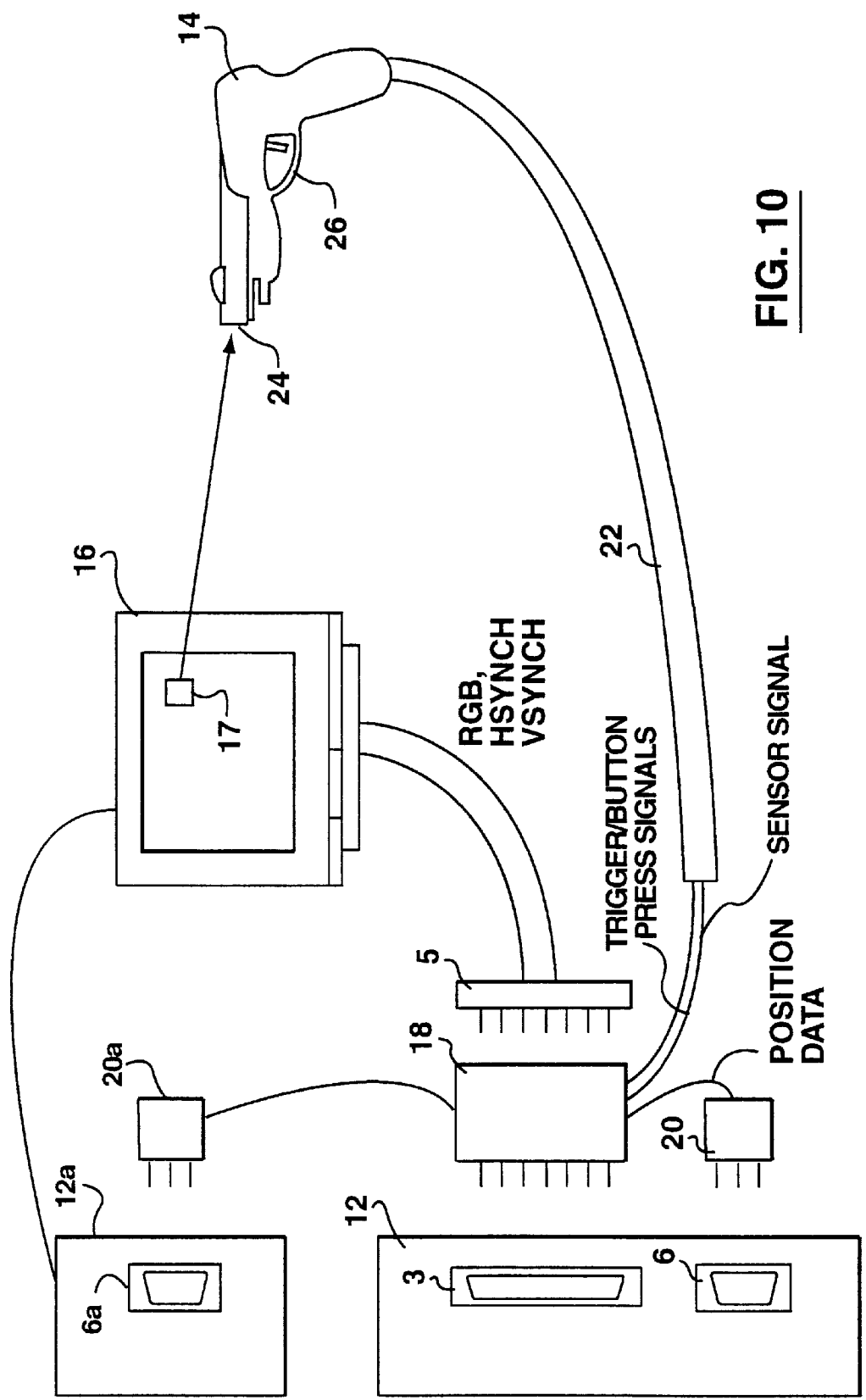

PHOTOSENSITIVE INPUT PERIPHERAL DEVICE IN A PERSONAL COMPUTER-BASED VIDEO GAMING PLATFORM

BACKGROUND OF THE INVENTION

This invention relates to a video game peripheral device having a photosensitive element for sensing the relative position of the field of view of the device in relation to a video monitor screen, and in particular to such a device that is compatible with a personal computer based game platform.

Video games are extremely popular for many reasons attributable to the game being played, as well as the variety of different input devices available for use in controlling or playing the game. For example, input devices include joysticks, steering wheels, gas/brake pedal assemblies, and photosensitive light guns. Light guns are particularly popular for use with games where targets are presented on the screen and the player must shoot the target by pointing the gun at the target and pulling a trigger.

In the home-based video game market, there are two basic types of platforms in use; the dedicated console platform, and the personal computer platform. Dedicated consoles are self-contained microprocessor-based units that function to receive game modules such as ROM cartridges or CD-ROMs, execute the instructions on the game module, and present the game's images and sounds to the player(s) via a conventional television set (or optionally a self-contained display screen). Input devices such as the light gun are connected to the console to allow the player to control the operation of the game in conjunction with the images viewed and sounds heard via the television set.

Personal computer based video games take advantage of existing computers already in use by millions of people, by allowing a player to play a game by simply loading and executing a video game program. Usually, a joystick is connected to a game port located within the computer, which allows the player to control operation of the game since the game port is coupled to the CPU via the computer's various buses. If a joystick or game port is not available, the player may be able to control the game with the keyboard or mouse, but the ergonomics presented by these devices do not lend themselves to efficient playing or enjoyment of the game.

Although many games can be played on the personal computer platform without the joystick, it is not practical to play a shooting game unless a light gun is utilized. That is, the very nature of the shooting game requires the player to aim at the screen with a sight on the gun and pull a trigger at the desired time in hopes of "hitting" the target. There is no practical way of emulating this experience with a keyboard or mouse since they cannot be aligned visually with the screen targets, and they cannot provide the screen positional feedback data (to be described below) to the CPU that is necessary to control the game.

Light guns have been used with television sets connected to dedicated consoles for several years. The light gun relies on the physics of the television screen to detect the specific location at which the light gun is pointed at any particular time. As well known in the art, television screens utilize a scanning electron beam (or beams) that trace horizontally and vertically in a raster pattern to form the image that the viewer's eyes perceive. As an aid in generating the raster pattern, horizontal and vertical synchronization signals are generated by the control electronics that produce the video signal and then detected and used by the electronics associated with the television to properly reproduce the image across the screen.

Although the scanning of the beam across and down the screen is generally not perceivable to the human eye, it is possible for a photosensitive device to detect the existence of the beam at a particular position on the screen. This is the basis on which light guns operate with dedicated video game consoles in use today. Thus, the light gun has a photosensitive device located at the tip of the simulated gun, as well as an electronic switch that is actuatable by pulling a simulated trigger. When the photosensitive device is pointed at a target area on the screen, it will sense when the electron beam is scanned across the screen and send that information (optionally in conjunction with a trigger press) to an input port on the dedicated game console. Since the CPU in the game console generated the images to be displayed on the screen, and in particular since it generated the horizontal and vertical synchronization signals, it can determine the relative position on the screen at which the light gun was aimed by calculating the phase difference between the start of the raster pattern and the time the electron beam was sensed by the photosensitive device.

Notwithstanding their popularity, light guns have heretofore not been able to be used with video games running on personal computers because of the certain differences that exist between the dedicated game console and the personal computer, which make the conventional light gun impossible to use. In a personal computer, the CPU provides digital image data in the form of frames or bit maps to a video adapter board (e.g., a VGA or SVGA board). The video adapter board then generates the appropriate red, green and blue analog signals that are output to the monitor (so-called RGB signals). Importantly, the video board also generates the synchronization timing signals (vertical and horizontal synch) that are also sent to the monitor to control the scanning raster. Since the CPU did not generate the synch signals, it cannot calculate the relative position on the screen at which the light gun was aimed. That is, the CPU cannot calculate the phase difference between the start of the raster pattern and the time the electron beam was sensed by the photosensitive device since it does not know when the synch signals were generated. Thus, the personal computer platform is disadvantaged from the dedicated game console since a conventional light gun cannot be used in game play.

One prior art system (by A-FOUR TECH CO., LTD.) attempts to overcome this disadvantage by providing an add-on board that must be inserted into an empty ISA slot on the motherboard. A ribbon cable is then connected from the add-on board to a VGA Feature Connector on the VGA card, and the light gun is plugged into the add-on board. This requires the user to open the computer, and install the add-on board and cable. This may not be practical since there may be no open board slots on the motherboard, the user may be unable to perform the technical operation of installing add-on boards, etc. In addition, the user cannot easily transfer the light gun to another computer without having to disassemble his computer, remove the add-on board, and install it on a companion's computer. This system is thus disadvantageous for most users.

It is therefore an object of the present invention to overcome the prior art and provide a light gun system that can be utilized with a conventional personal computer video game platform.

It is a further object of the invention to provide such a light gun system that will not require modification to the personal computer platform.

It is a still further object of the present invention to provide such a light gun system that can be easily installed without having to dismantle the personal computer to install additional circuitry.

SUMMARY OF THE INVENTION

In accordance with these and other objects, provided is a video game system comprising a personal computer, a video monitor for displaying images on a screen, a light-sensitive video game peripheral device such as a gun-shaped device, and a peripheral adapter coupled between the computer, the monitor, and the peripheral device.

More particularly, the personal computer comprises computer processing means for executing a video game program, the computer processing means generating a plurality of display frames representative of images to be displayed on the video monitor screen, and video adapter means coupled to the computer processing means for processing the display frames and generating analog display signals proportional thereto and synchronization signals correlated to the analog display signals, wherein the analog display signals and the synchronization signals are output to a video port connector.

The peripheral adapter is coupled to the video port connector and is configured to output the analog display signals and the synchronization signals to the video monitor. The peripheral adapter is also configured to output the synchronization signals to the video game peripheral device. The video monitor is coupled to the peripheral adapter and processes the analog display signals and the synchronization signals to display images on its screen.

The video game peripheral device comprises a photosensitive transducer for outputting an electrical signal proportional to light sensed thereby, means for receiving the synchronization signals from the peripheral adapter, peripheral processing means for processing the electrical signal from the photosensitive device and the synchronization signals from the peripheral adapter and for generating a peripheral position signal indicative of the relative position of the field of view of the photosensitive transducer relative to the screen. The video game peripheral device also comprises means for transmitting the peripheral position signal to the computer means for further processing.

The video game peripheral device may also comprise a manually operated switch configured to provide a trigger signal to the peripheral processing means, wherein the peripheral position signal is transmitted to the computer means in response to actuation of the switch.

Preferably, the video game peripheral device is shaped like a gun comprising a barrel, and the photosensitive device is located near the tip of the barrel.

The synchronization signals typically comprise a horizontal synchronization signal and a vertical synchronization signal, and the peripheral position signal comprises a relative x-coordinate and a relative y-coordinate.

The peripheral processing means comprises initialization means for measuring a set of initialization parameters correlated to an x-dimension of a raster pattern traced on the video monitor screen and a y-dimension of the raster pattern, means for sensing an activation of a trigger signal, and means for determining the relative x-position and the relative y-position of the field of view of the light gun positioned on the screen when the trigger is activated.

The initialization means comprises first means for sensing the active polarity of the horizontal synchronization signal, and second means for sensing the active polarity of the vertical synchronization signal. The initialization means also comprises first means for determining the y-resolution Y of the raster pattern and second means for determining the x-resolution Xs of the raster pattern.

The means for determining the relative x-position and the relative y-position of the field of view of the light gun positioned on the screen when the trigger is activated comprises means for detecting a pulse in the electrical signal from the photosensitive device, means for counting the number of horizontal synchronization traces from the time the vertical synchronization signal transitioned to its active state until the time the pulse is detected, the number of traces being defined as Yc, and means for timing the duration of the horizontal synchronization signal from the time the horizontal synchronization signal transitioned to its active state until the time the pulse is detected, the timing means being reset when said horizontal synchronization signal transitions to its inactive state before the pulse is detected, the timed duration being defined as Xt.

The peripheral position signal comprises the ratios Xt/Xs and Yc/Ys, and is sent to the computer wherein the computer processing means determines the X-pixel coordinate by the formula Xr*Xt/Xs, wherein Xr is the X-axis pixel resolution of the video monitor screen, and the computer processing means determines the Y-pixel coordinate by the formula Yr*Yc/Ys, wherein Yr is the Y-axis pixel resolution of the video monitor screen.

In an alternative embodiment, the peripheral processing means for generating a peripheral position signal and the means for transmitting the peripheral position signal to the computer means are both located within the peripheral adapter.

BRIEF DESCRIPTION OF THE DRAWING

FIG. 5 is a timing diagram of the synchronization signals and RGB signals generated by the video adapter;

FIG. 6(*a*) is an illustration of a raster scan pattern;

FIG. 6(*b*) is an illustration of waveforms used with the raster scan pattern;

FIG. 8(*b*) is a schematic of the transmitter and power circuits in the light gun;

FIG. 8(*c*) is a schematic of the photosensor circuit in the light gun;

FIG. 10 illustrates an alternative embodiment of the invention; and

DETAILED DESCRIPTION OF THE PREFERRED EMBODIMENT

Figure 1:
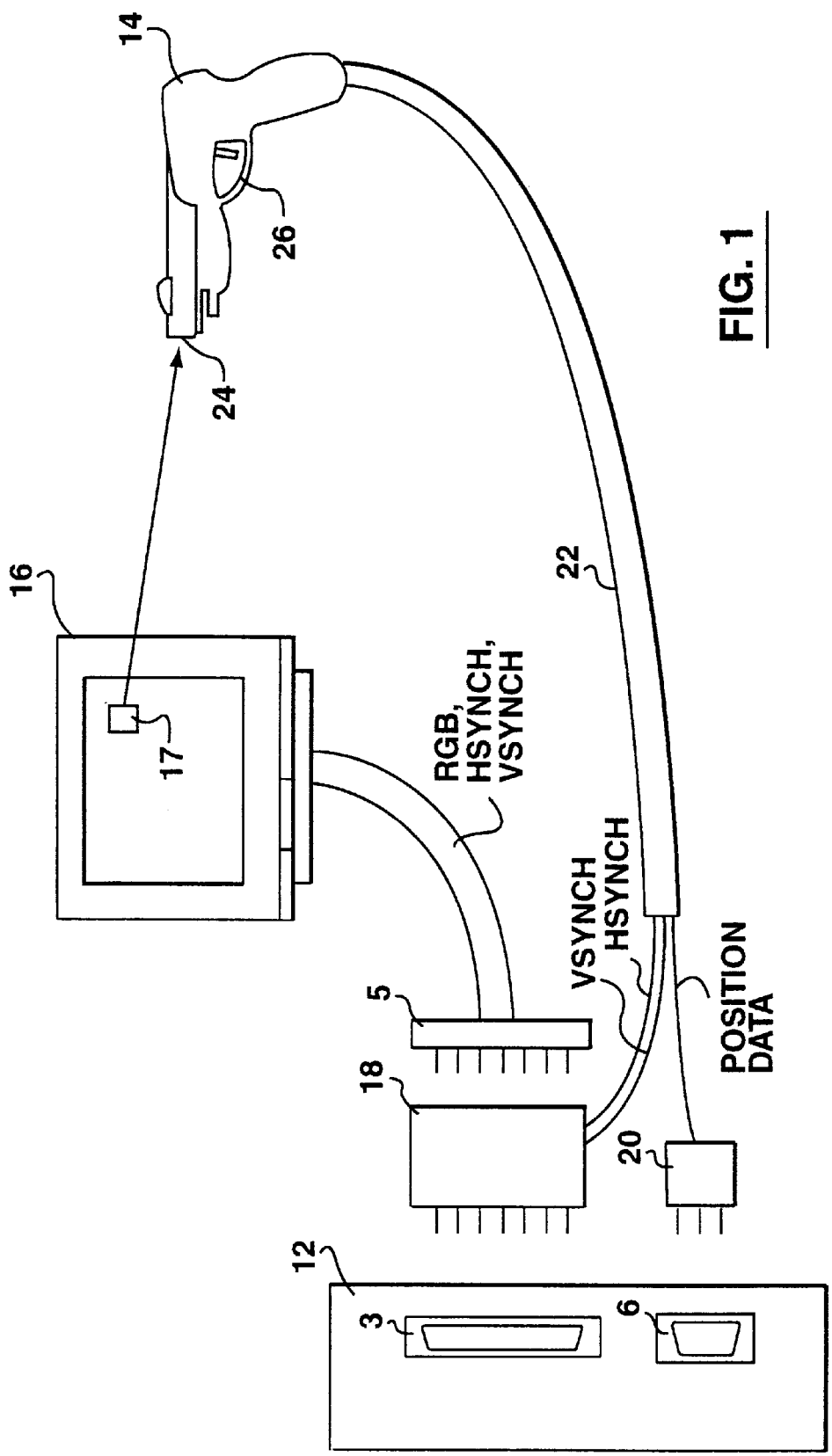
FIG. 1 is an illustration of the main components of the preferred embodiment of the present invention.

The preferred embodiment of the present invention will now be described with reference to FIG. 1. The video game system 10 comprises a personal computer 12, a light gun peripheral device 14, a video monitor 16, and a peripheral adapter 18. The computer 12 is a standard type that is capable of executing a video game program that is adapted to utilize the position data input from the light gun 14 on a serial port 6. For example, the computer 12 may utilize a 300 MHz Pentium II processor with 64M RAM, a video adapter card suitable for displaying images generated during operation of the video game, such as a VGA card and the like. The computer 12 needs no special internal hardware such as add-on boards or the like as in the prior art in order to implement the present invention. Likewise, the monitor 16 is a standard video monitor that utilizes industry standard RGB (red-green-blue) input signals as well known in the art. The video monitor also needs no special adaptation to operate with the present invention.

Figure 2:
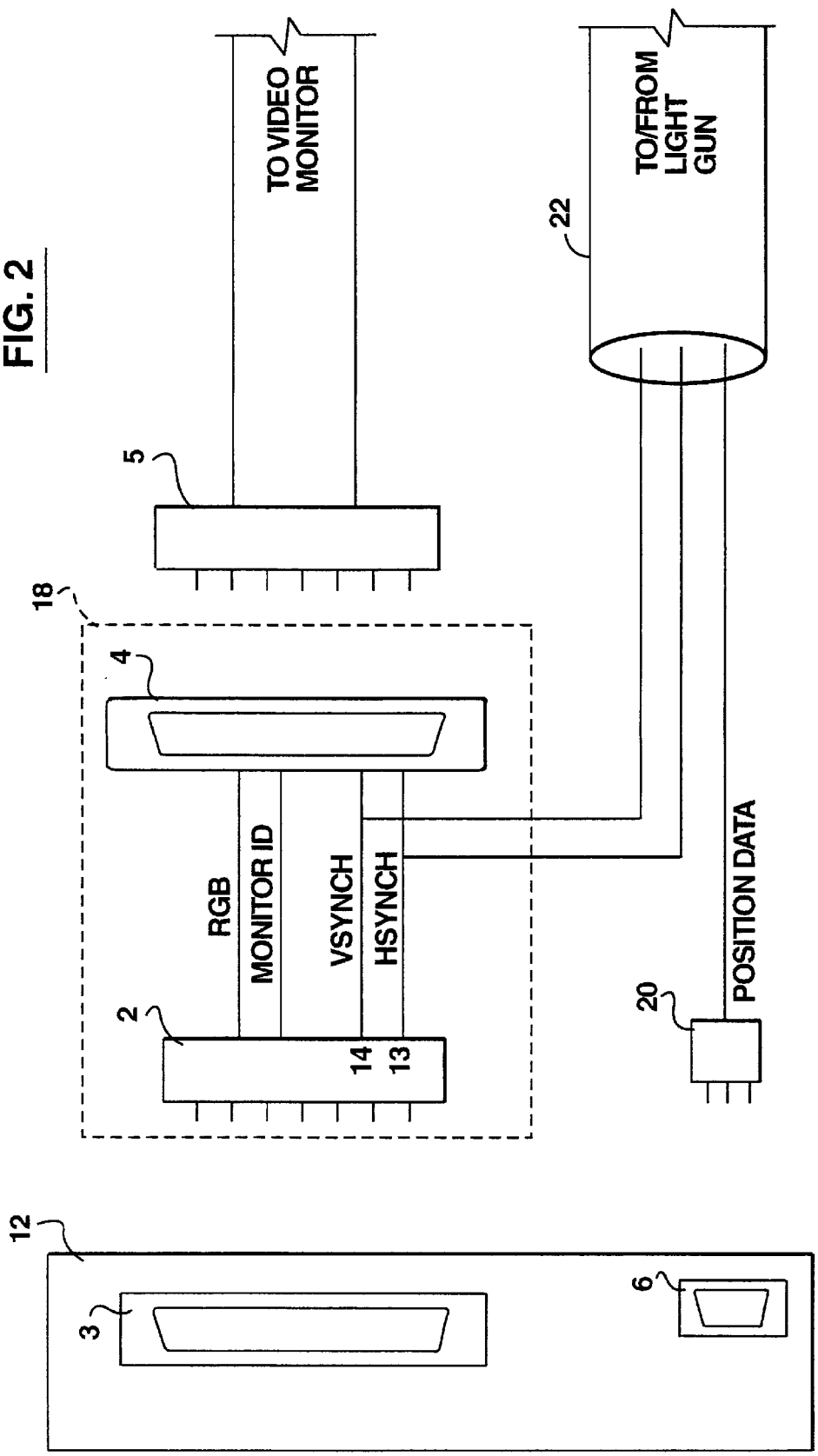
FIG. 2 is a detailed illustration of the peripheral adapter.

The peripheral adapter 18 shown in FIG. 2 is essentially a pass-through connector unit that has an industry standard VGA (video graphics adapter) male plug 2 at one end, suitable for coupling with an industry standard VGA female connector 3 found on typical VGA adapter cards. The peripheral adapter 18 also comprises a standard VGA female connector 4 for coupling with the associated VGA male plug 5 that is connected to the monitor 16. Thus, the adapter 18 is inserted between the monitor 16 and the VGA connector 3 and passes the appropriate signals from the VGA adapter card through to the monitor 16 for processing in the usual manner. The peripheral adapter 18 also has wires from cable 22 that are connected to certain control signals (horizontal and vertical synchronization signals) that enables these signals to be passed to the light gun 14 for further processing as described below.

The cable 22 also provides wires from the light gun 14 to a serial port connector 20, which is coupled to an associated serial connector 6 on the computer 12 as well known in the art. Position data signals are input through the cable 22 to the serial port connector 20 for input to the processing circuitry within the computer 12 as will be described below.

The light gun 14 comprises a photosensor 24 and a trigger 26 as shown in FIG. 1. The trigger 26 is coupled to an internal switch, and is adapted to provide a trigger signal to internal circuitry components for indicating that the player has pulled the trigger to emulate the act of shooting. The photosensor is also connected to the internal circuitry components, and provides an electrical signal that is proportionate to the light incident thereon. Specifically, the electrical signal will have an increased value as the brightness increases, and will be at a maximum when an electron scanning beam that is following a raster pattern on the monitor 16 crosses its field of view 17.

Figure 3:
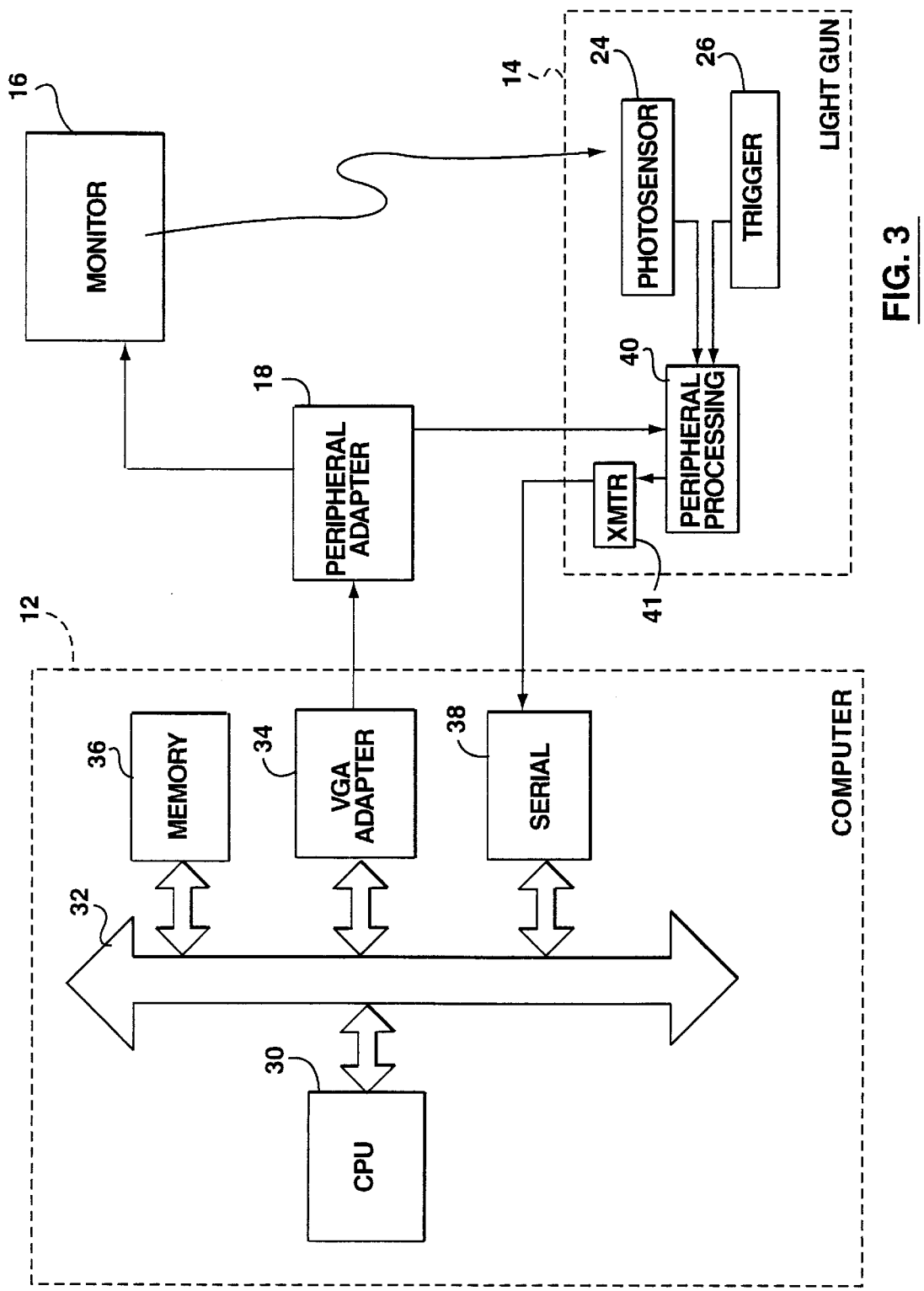
FIG. 3 is a block diagram of the electrical components of FIG. 1.

FIG. 3 illustrates a block diagram of the system 10. The computer 12 has standard internal components found in typical personal computers today, in particular a CPU 30, a memory 36, a VGA adapter card 34, and a serial interface circuit 38. These components are shown as communicating with each other via bus 32, which comprises data bus signals, address bus signals, and control bus signals as well known in the art. The memory 36 is used for storing program instructions for executing the video game, and may be CD-ROM, a hard disk drive, etc. The CPU 30 performs standard processing and control functions as well known in the art. The VGA adapter 34 is also well known in the art, and functions to convert digital data frames output by the CPU 30 into the appropriate RGB analog signals and synchronization signals that are sent to the monitor 16 in typical fashion.

Thus, the VGA adapter 34 generates standard red, green and blue analog signals (R-G-B) that are used by the video monitor 16 to recreate the image desired on the screen. The R-G-B signals (described further below) are sent from the VGA adapter 34, through the peripheral adapter 18, and to the monitor 16. Likewise, horizontal and vertical synchronization signals are generated by the VGA adapter 34 and sent via the peripheral adapter 18 to the monitor 16 in order to control the raster scanning as well known in the art. The present invention, however, will utilize this synchronization information generated by the VGA adapter 34, which is unavailable to the CPU 30, to generate positional data that is fed back to the CPU 30 via the serial interface circuit 38. Thus, the peripheral adapter 18 feeds the horizontal and vertical synchronization signals to the light gun 14, in particular to the processing circuitry 40 located within the light gun.

The light gun 14 has a photosensor 24 mounted strategically near the tip for emulation of a real gun. The player points the gun at the monitor screen, and pulls the trigger switch 26 when he desires to shoot an image displayed on the screen. When the trigger is pulled thusly, positional data is generated that is related to the x-coordinate and y-coordinate of the field of view 17 pointed at by the photosensor 24. The methodology for the determination of the particular position of the field of view 17 by utilizing horizontal and vertical synchronization signals as well as the output of the photosensor 24 is another aspect of the present invention that is described in detail below.

Figure 4:
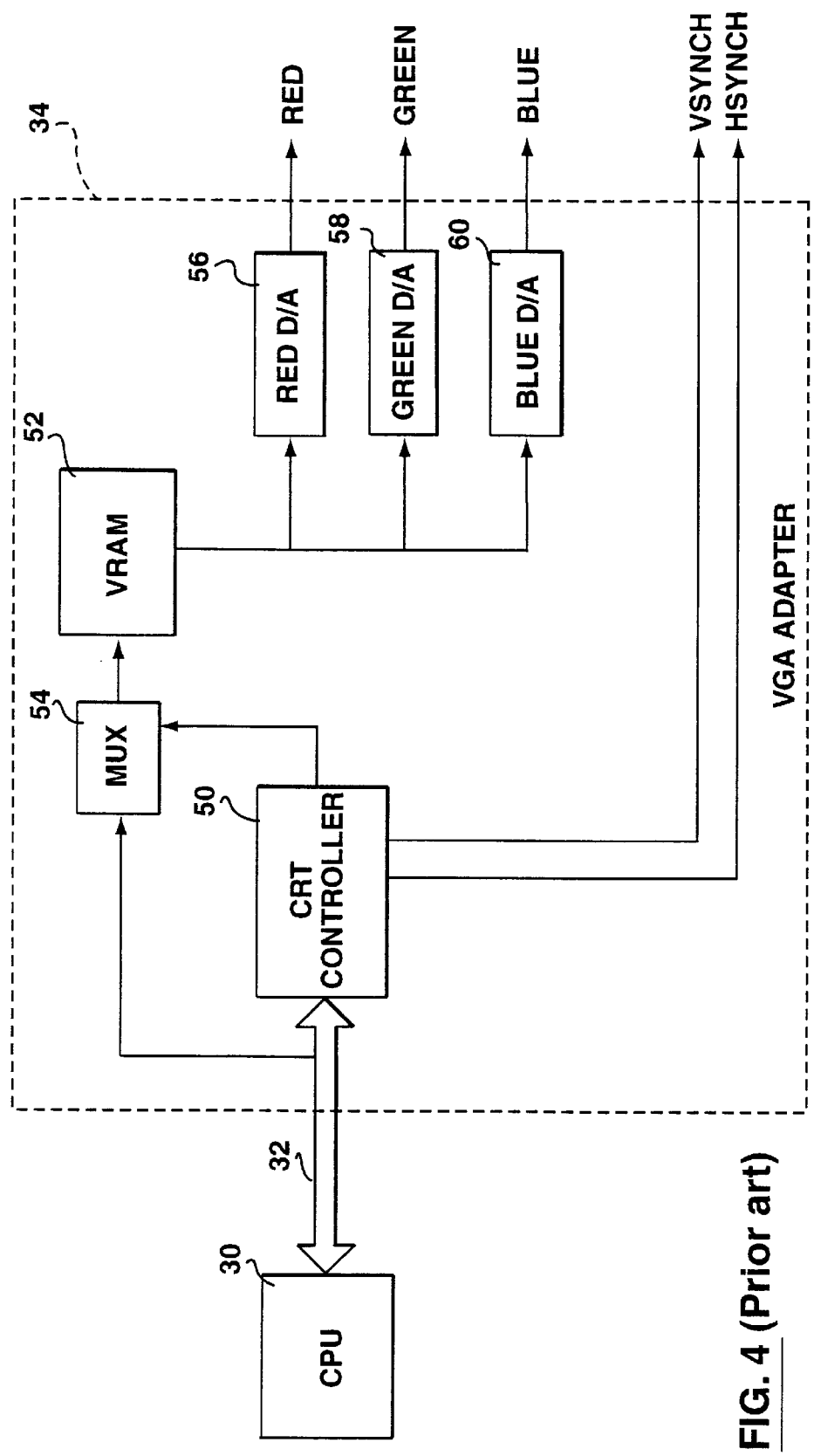
FIG. 4 is a block diagram of a typical video adapter in the prior art.

FIG. 4 illustrates a detailed block diagram of the VGA adapter card utilized with the present invention. The CPU and VGA adapter 34 are both coupled to the bus 32, which enables the CPU to send frames of digital data (i.e., bit-maps) to the VGA adapter so it may convert the frames and provide appropriate signals to the monitor for display. The main components of the VGA adapter 34 are the CRT controller 50, the Video RAM (VRAM) 52, the multiplexer 54, and three separate but functionally equivalent digital-to-analog (D/A) converters Red D/A 56, Green D/A 58, and Blue D/A 60. The VRAM 52 is dual-ported, meaning that it can be accessed by the CPU 30 (for data writes) or the CRT controller 50 (for data reads).

The CRT controller 50 generates appropriately timed horizontal and vertical synchronization signals hsynch and vsynch that are supplied to the connector 3 and eventually to the monitor and light gun processing circuitry via the peripheral adapter 18. The CRT controller 50 also reads the VRAM 52 at the appropriate time to generate the red, green and blue analog output signals that are fed to the monitor 16 via the connector 3. FIG. 5 illustrates these signals for an exemplary VGA application. The vsynch signal is utilized by the monitor's circuitry to initiate the start of a raster pattern, which is shown in FIG. 6a. The low logic level pulse at the beginning of vsynch is used as a blanking interval for the time when the scanning beam in the monitor retraces from the bottom right portion of the screen 60 back to the upper left portion of the screen 62 for the next scan cycle. The horizontal synch signal, also shown in FIG. 5, repeats a plurality of times for each vertical synch cycle, and is used to control the horizontal trace of the scanning electron beam. Likewise, the logic low level of hsynch is used to blank the electron beam when the horizontal trace is completed and the beam retraces back to the left portion of the screen.

The red, green and blue signals are analog voltage levels with amplitudes that are proportional to the amount of that particular color that will be illuminated on a given area of the screen, the relative voltage levels being derived in accordance with the desired color, as well known in the art.

Figure 7:
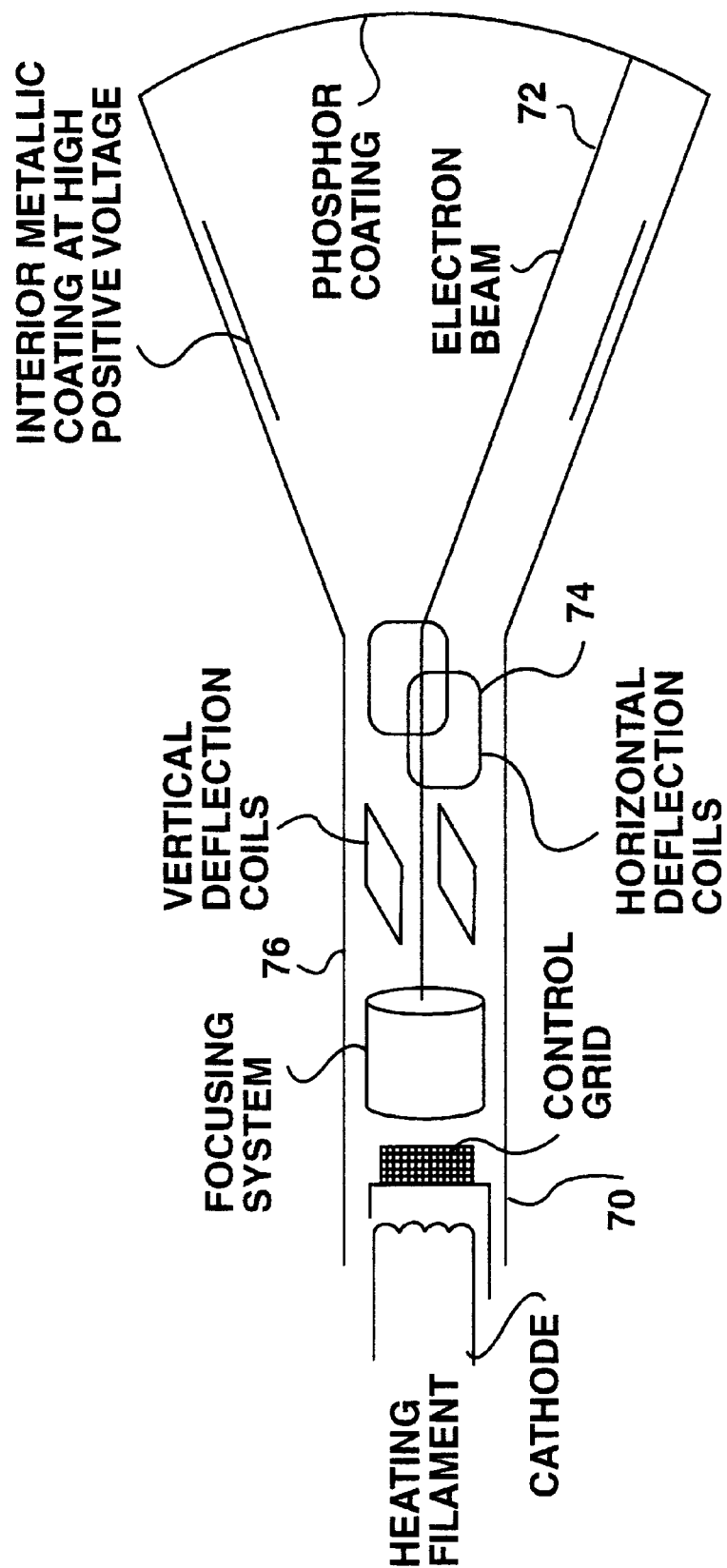
FIG. 7 is an illustration of a prior art monitor and control electronics.

FIG. 7 illustrates the main functions of a typical computer monitor. The red, green and blue analog voltage levels are applied to a control grid 70, such that the intensity of the electron beam 72 generated by the control grid is greater when the amplitude of the analog input signal is greater. The horizontal synch signal is used by the horizontal deflection coils 74 to trace the beam across the screen continually, while the vertical synch signal is used by the vertical deflection coils 76 to trace the beam down the screen at a lower frequency than the horizontal sweep. The high frequency sawtooth wave shown in FIG. 6(b) is generated by the horizontal synch signal; the lower frequency sawtooth wave is generated by the vertical synch signal. During the retrace period (when the sawtooth waves are at low volatge), the beam is returned back to the appropriate starting position. During this return time, the synch signal is used to blank the screen by lowering the intensity of the beam via the control grid, as well known in the art. The result of this technique is that the electron beam is swept in the raster pattern shown in FIG. 6(a). More information on the use of VGA adapters and raster scanning video monitors may be found in *The Personal Computer From The Inside Out*, Sargent et al., which is incorporated by reference herein.

In order to determine the location of the field of view 17 of the photosensor 24 at which the player aims the light gun 14, the processing logic 40 that is used must be provided with information correlated to the timing of the raster pattern. In the prior art, this has not been easily done in the CPU of the computer because the CPU does not have access to this information without special internal add-on circuitry. In the present invention, however, part of the field-of-view location calculation is performed external to the computer CPU, by processing circuitry and logic 40 in the light gun 14, by feeding the synch signals from the peripheral adapter 18 of the present invention directly to the light gun 14 as herein described. The position data is then transmitted to the computer 12, where it is utilized by the CPU 30 along with the predetermined VGA resolution data (e.g. 640×480) to determine the pixel coordinates X, Y.

Figure 8B:
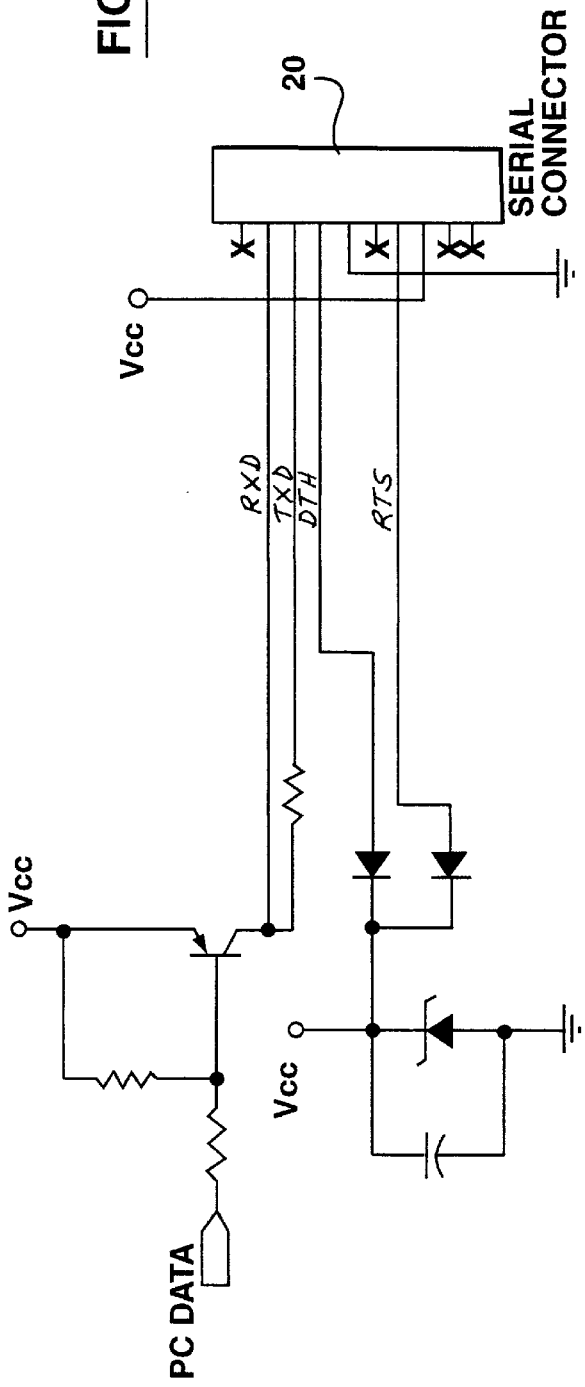
FIG. 8(*a*) is a detailed schematic of the peripheral device processing circuit.

FIG. 8(a) is a schematic diagram of the processing block 40 provided in the light gun. The processing block 40 comprises a programmable interrupt controller (PIC) 80, a counter control circuit 82, and an oscillator 84. The oscillator 84 operates with the counter control circuit 82 to provide counter functions as required. The analog electrical signal sensor that is generated by the photosensor 24 (shown in FIG. 8(c)) is input to the PIC 80 so that the initialization and timer routines will initiate whenever the trigger 26 is pulled by the player. The PIC 80 and counter control circuit 82 operate to count the number of complete horizontal traces made by the raster since the current vertical trace began. This number is reset for every new vertical trace. In addition to counting the number of horizontal traces, the processing circuitry times the duration from the beginning of the current (incomplete) horizontal trace until the time the photosensor detects the presence of the electron beam in its field of view, which is dependent on the location of the screen at which the player aims. Thus, the logic can calculate the phase difference between the start of the raster scan and the time the beam is detected, and this information is sent to the computer 12 whenever the trigger is pulled by the player.

Figure 8C:
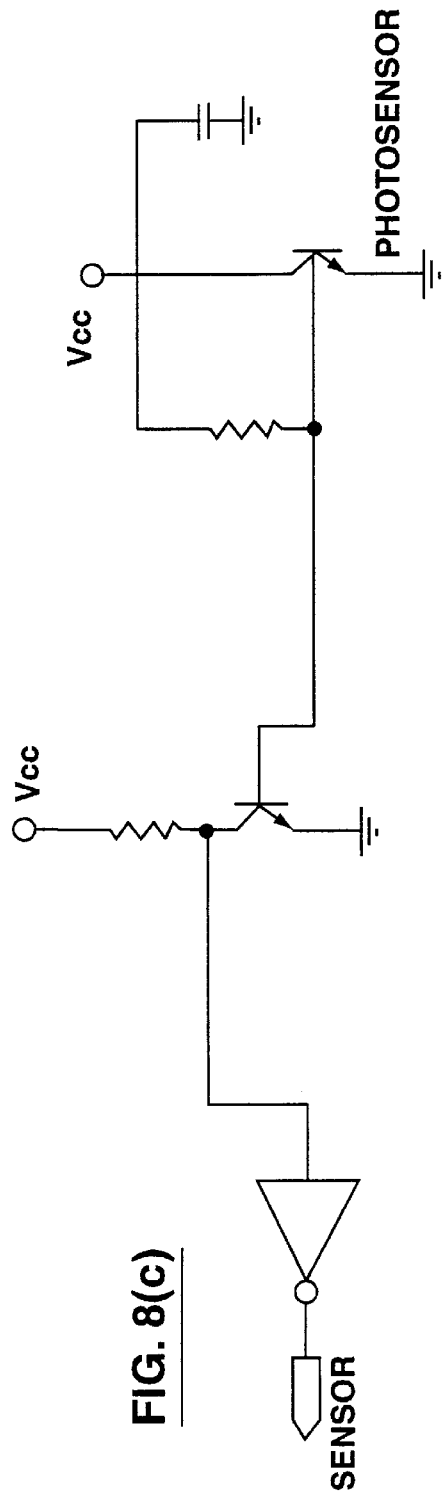

This positional data PCDATA is sent as a serial bit stream by the light gun transmitter circuit 41 (FIG. 8(c)) into the cable 22. This serial data stream is received by the computer, via the serial connector 20, for processing by the CPU 30. The CPU calculates the X, Y pixel coordinates and can then take appropriate action as dictated by the requirements of the game. For example, the CPU can determine if the player hit or missed a particular target, and change the player's score accordingly.

Figure 9A:
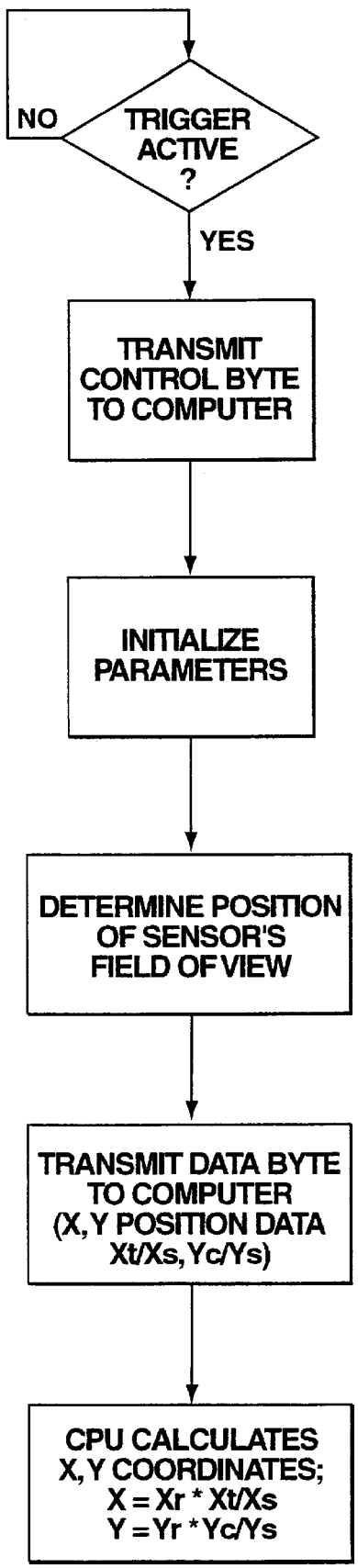
FIGS. 9(*a*), 9(*b*) and 9(*c*) are flowcharts that illustrate the operation of the invention.

The detailed operation of the peripheral processing circuitry 40 will now be described with reference to the flowcharts of FIGS. 9(a) through 9(c). The processing logic waits until it senses that the player has activated the trigger 26, which will be indicated by the signal Bt_fire switching low. When BT_fire goes low, a control byte is sent from the light gun 14 to the computer 16 to indicate that he trigger has been activated. This will cause the CPU 30 to generate several (e.g. 3 or 4) complete screens of white light. Since the field of view of the photosensor 24 may be pointed at a dark area of the monitor screen, and would therefore in such cases be unable to provide an electrical pulse at the time the beam is traced through the field of view (because dark areas are created by a scanning beam with little or no voltage), there is a chance that a pulse will not be detectable when the trigger is pulled. By flashing the screen several times upon activation of the trigger, a pulse will be easy to detect (white light is caused by a scanning beam at maximum voltage) no matter where the filed of view is aimed on the screen. Moreover, the game being played will not be deleteriously affected because the player will not be able to perceive the flashing screen.

After the screen is flashed several times as a result of the control byte sent to the CPU, a parameter initialization process is initiated (described below). This will provide for the determination of the polarity of the HSYNCH and VSYNCH signals, which may vary among different manufacturers. The initialization sequence also determines the resolution of the raster for subsequent X and Y coordinate calculations.

After the parameters are initialized, the position of the field of view 17 of the photosensor 24 is determined by utilizing pulse counting and duration timing techniques upon detection of the input pulse from the photosensor 24 (described below). The relative X and Y positional data are then calculated and transmitted in serial format to the computer 12. The CPU utilizes the relative X and Y positional data along with its knowledge of the VGA screen resolution (e.g. 640×480) to calculate the X and Y pixel coordinates and continue execution of the video game program.

Figures 9B, 9C:
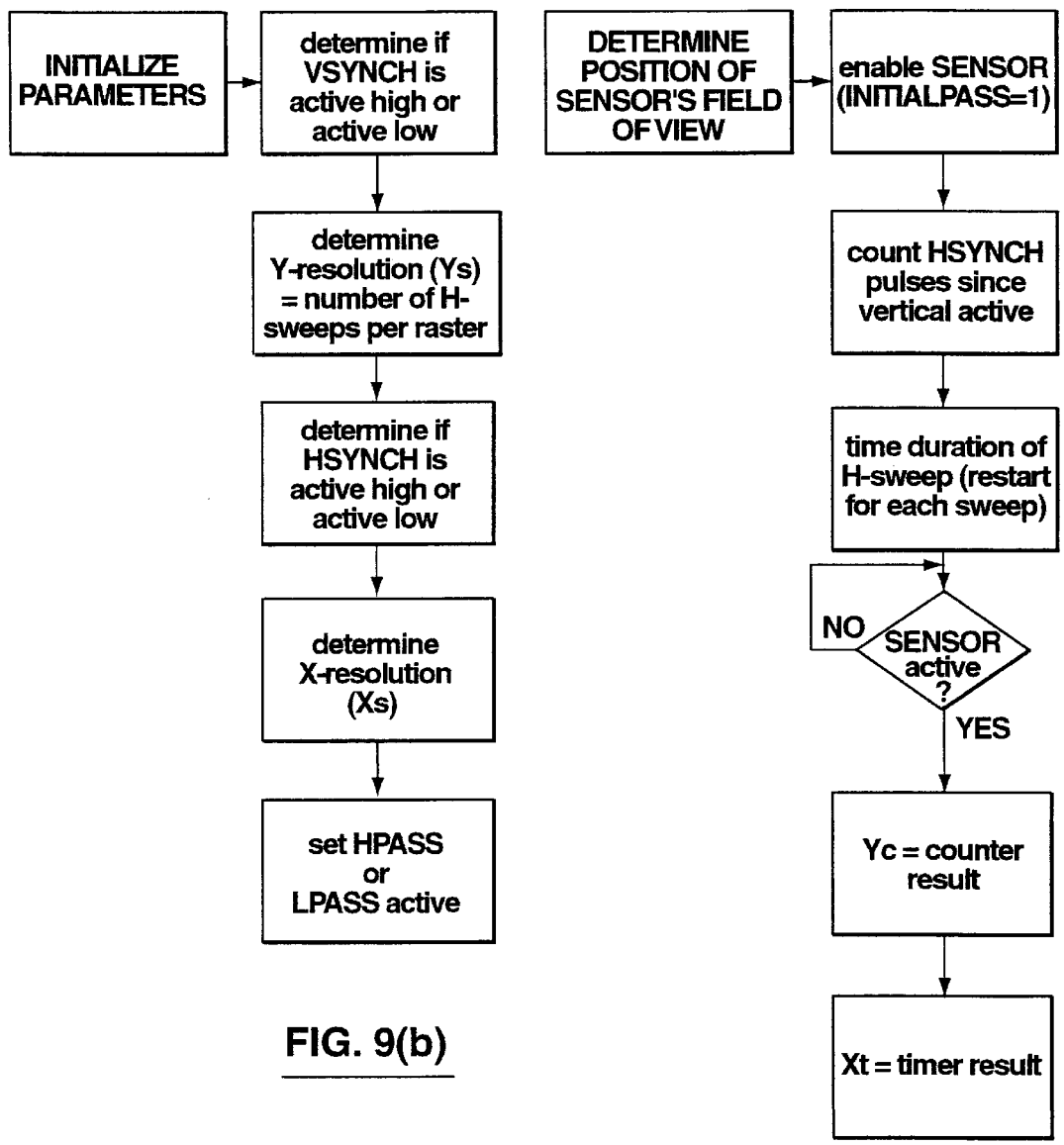

FIG. 9(b) illustrates the parameter initialization sequence. Upon detecting that the trigger has been activated by sensing Bt_fire going low, the polarity of VSYNCH is first determined. The PIC 80 counts the number of pulses of HYSNCH while VSYNCH is low (HYSYNCHLOW), and also counts the number of pulses of HSYNCH while VSYNCH is high (HSYNCHHIGH). If HYSYNCHLOW is greater than HYSNCHHIGH, then VSYNCH must be active low, and if HYSNCHHIGH is greater than HSYNCHLOW, then VSYNCH must be active high.

Next, the Y-resolution Ys is determined by the number of pulses of HYSNCH that are counted during the VSYNCH active state just determined. That is, if VYSNCH is active high, then Ys is equal to HSYNCHHIGH. If, however, VSYNCH is active low, them Ys is equal to HSYNCHLOW.

The polarity of HSYNCH is then determined by starting a timer function in the PIC 80. This is accomplished by switching INITIALPASS low, which gates the clock signal through AND gate 100. The timer function then counts the number of CLOCK pulses during the low-level period of HSYNCH (HSYNCHTIMELOW), and the timer function likewise counts the number of CLOCK pulses during the high-level period of HSYNCH (HSYNCHTIMEHIGH). If HYSYNCHTIMELOW is greater than HSYNCHTIMEHIGH, then HSYNCH must be active low, and if HYSYNCHTIMEHIGH is greater than HSYNCHTIMELOW, then HSYNCH must be active high.

Next, the X-resolution Xs is determined by the time measured during the HSYNCH active state just determined. That is, if HYSNCH is active high, then Xs is equal to HSYNCHTIMEHIGH. If, however, HSYNCH is active low, them Xs is equal to HSYNCHTIMELOW.

Finally, the PIC 80 will set either HIGHPASS to one or will set LOWPASS to logic one, depending on the previously determined active state of HSYNCH. That is, if HSYNCH is active low, then LOWPASS is set to one, but if HSYNCH is active high, then HIGHPASS is set to one. This enables the PIC to utilize HYSYNCH while in its proper polarity.

After this initialization process is completed, the position of the field of view of the photosensor is determined, as shown in FIG. 9(c). First, the PIC 80 switches INITIALPASS high, thus enabling the signal SENSOR to pass through to AND gate 100. The number of HSYNCH pulses since VSYNCH last went active is counted by the PIC 80. At the same time, the PIC 80 starts a timer function from the HSYNCH active edge, and stops the timer at the HSYNCH retrace edge (the end of the trace). As long as SENSOR is high (inactive - no pulse detected yet), then the HSYNCH pulse counter and timer functions keep operating. When SENSOR transitions low, indicating that the photosensor 24 has detected the scanning electron beam in its field of view on the monitor screen, then the HSYNCH pulse count is stored in a register in the PIC 80 as Yc, and the current HSYNCH timer result is stored in a register in the PIC as Xt.

Referring back to FIG. 9(a), the X and Y position data is sent back to the CPU for further processing. That is, the ratios Xt/Xs and Yc/Ys are sent to the CPU. Each ratio represents the position on the screen of the field of view in terms of relative percentage. The CPU utilizes this data along with the predetermined VGA screen resolution to calculate the X and Y pixel coordinates at which the field of view is positioned. The X-pixel coordinate is defined by the equation X=Xr*Xt/Xs, where Xt is the measured HSYNCH timer result, Xs is the measured X-resolution, and Xr is a physical resolution coordinate that is stored in the computer 12 (e.g. Xr=640 for a 640×480 VGA resolution). Likewise, the Y-pixel coordinate is defined by the equation Y=Yr*Yc/Ys, where Yc is the measured HSYNCH counter result, Ys is the measured Y-resolution, and Yr is a physical resolution coordinate that is stored in the computer 12 (e.g. Yr=480 for a 640×480 VGA resolution).

Other embodiments may be used in conjunction with this invention. For example, the phase delay timing between the raster start time and the detection of the electron beam may be performed in other manners in order to determine the location of the field of view of the photosensor.

In addition to transmitting the X and Y position data to the computer 12 via the serial interface, other means for providing the position data may be utilized. For example, the relatively recent Universal Serial Bus (USB), a parallel input port (in which case the parallel to serial conversion would be unnecessary), a SCSI input port, a wireless infrared link, or an RF link and the like may be utilized in conjunction with the present invention.

Figure 11A:
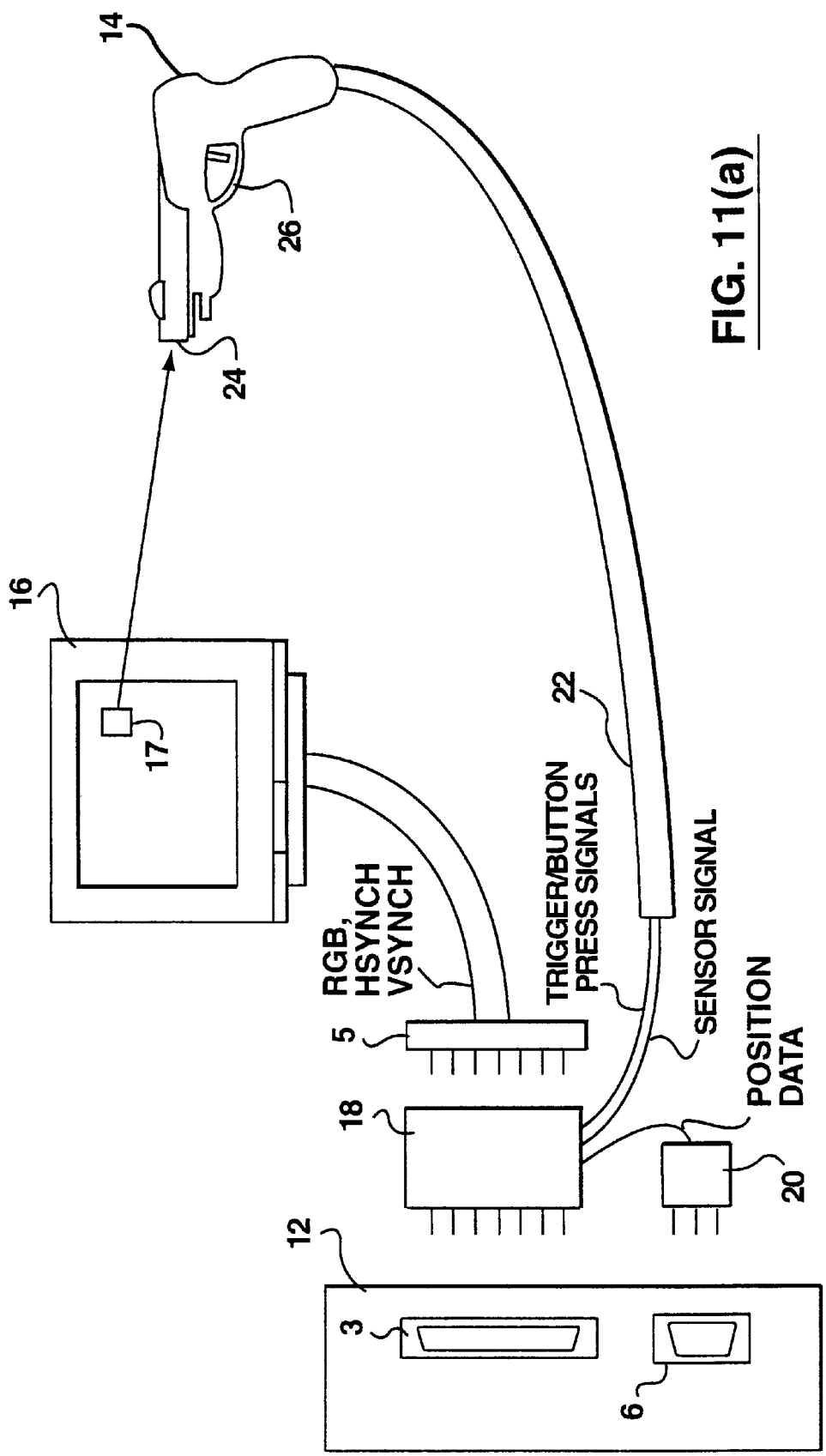
FIGS. 11(*a*) and 11(*b*) illustrate an alternative embodiment of the invention wherein the processing electronics is located in the adapter device rather than the light gun device.
Figure 11B:
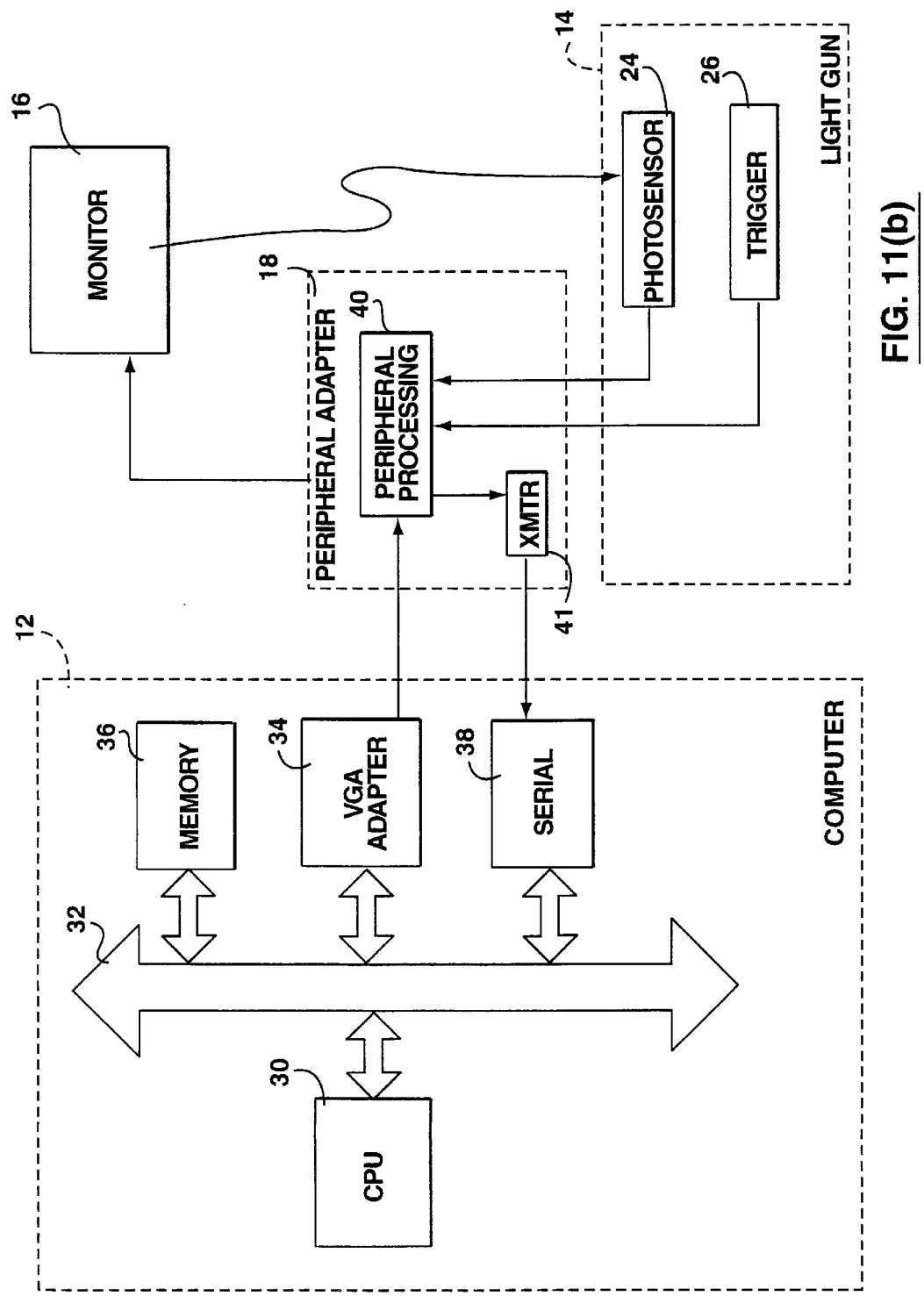

In addition, it is envisioned that the processing electronics contained in the light gun 14 (i.e. the peripheral processing circuitry 40 and the transmitter circuit 41) could be located in the peripheral adapter 18, as shown in FIGS. 11(a) and 11(b). In this case, the light gun 14 would provide only the signals from the trigger (and other buttons) and the photosensor, which would be wired (or sent wirelessly if desired) to the processing circuitry 40 in the peripheral adapter 18. The X and Y position data would then be transmitted directly from the peripheral adapter 18 to the serial connector 20 and ultimately to the CPU 30 for further processing.

An additional variation of this embodiment could include circuitry suitable for providing appropriate sensor and trigger press data to a dedicated game console platform as well as to the PC platform described herein. As shown in FIG. 10, the adapter 18 would be configured to be connectable to a dedicated game console platform 12a, via connectors 20a and 6a. The appropriate processing circuitry would be added to the adapter 18 that would enable it to also provide photosensor and trigger signals directly to the game console 12a as is standardized and well known in the art. In this case, the HSYNCH and VSYNCH signals would not have to be input to the adapter 18 because they are known to the controller circuitry within the game console 12a, and therefore the actual X, Y position and/or pixel data can be calculated within the game console 12a by providing to it only the sensor and trigger data signals. This embodiment allows the user to purchase one light gun device and adapter system, and utilize it with either the PC environment or the game console environment by simply plugging it into the desired platform.

In yet another embodiment, the VGA adapter card may be specially designed to include the processing logic carried out by the processing circuitry 40, thus eliminating the requirement that the processing 40 be external to the computer 12. In this case, the VSYNCH and HSYNCH signals are of course available on the VGA adapter 34, and the sensor signal and trigger pull signal would be input directly from the light gun 14 to the computer 12 by the serial port. The calculation of the X and Y position data would then be carried out by the VGA adapter 34, and fed back to the CPU 30 via the system buses 32. Although this embodiment would require a specially designed VGA adapter 34 to be used (presumably supplied by the computer manufacturer at the option of the purchaser), it would not require the user to add an additional board in an empty motherboard slot as in the prior art devices.

Thus, the present invention advantageously provides for a light gun to be utilized with a personal computer video game system without requiring modification to the hardware configuration of the computer or to the operating system. The light gun may be easily transported to other computers for use therewith without having to dismantle the computer to retrieve added-on circuit boards.

What is claimed is:

1. A video game system comprising:
   a) a personal computer comprising
      i) computer processing means for executing a video game program, said computer processing means generating a plurality of display frames representative of images to be displayed on a video monitor screen;
      ii) video adapter means coupled to said computer processing means for processing said display frames and generating analog display signals proportional thereto and synchronization signals correlated to said analog display signals, said analog display signals and said synchronization signals being output to a video port associated therewith;
   b) a peripheral adapter external to said personal computer and coupled to said video port, said peripheral adapter configured to output said analog display signals and said synchronization signals to a video monitor, said peripheral adapter further configured to output said synchronization signals to a video game peripheral device;

c) a video monitor coupled to said peripheral adapter for processing said analog display signals and said synchronization signals to display images on a screen associated therewith; and d) a video game peripheral device connected to said peripheral adapter, comprising
  i) a photosensitive transducer having a field of view, said photosensitive transducer outputting an electrical signal proportional to light sensed in its field of view,
  ii) means for receiving said synchronization signals from said peripheral adapter,
  iii) peripheral processing means for processing said electrical signal from said photosensitive device and said synchronization signals and for generating a peripheral position signal indicative of the relative position of the field of view of said photosensitive transducer on said screen; and
  means for transmitting said peripheral position signal to an input port on said personal computer for further processing.

2. The video game system of claim 1 wherein said means for transmitting said peripheral position signal transmits in serial data format.

3. The video game system of claim 1 wherein said video game peripheral device further comprises a manually operated switch, said switch configured to provide a trigger signal to said peripheral processing means, and further wherein said peripheral position signal is transmitted to said personal computer in response to actuation of said switch.

4. The video game system of claim 3 wherein said synchronization signals comprise a horizontal synchronization signal and a vertical synchronization signal.

5. The video game system of claim 4 wherein said peripheral position signal comprises an x-coordinate and a y-coordinate.

6. The video game system of claim 4 wherein said peripheral processing means comprises:
  initialization means for measuring a set of initialization parameters correlated to an x-dimension of a raster pattern traced on said video monitor screen and a y-dimension of said raster pattern;
  means for sensing an activation of a trigger signal; and
  means for determining the relative x-position and the relative y-position of the field of view of the light gun positioned on the screen when the trigger is activated.

7. The video game system of claim 6 wherein said initialization means comprises:
  first means for sensing the active polarity of the horizontal synchronization signal; and
  second means for sensing the active polarity of the vertical synchronization signal.

8. The video game system of claim 7 wherein the second sensing means for sensing the active polarity of the vertical synchronization signal comprises:
  means for counting the number of horizontal synchronization pulses during a low state of said vertical synchronization signal;
  means for counting the number of horizontal synchronization pulses during a high state of said vertical synchronization signal; and
  means for establishing the polarity of the vertical synchronization signal to be
    (i) active high if the number of horizontal synchronization pulses counted during a high state of said vertical synchronization signal is greater than the number of horizontal synchronization pulses counted during a low state of said vertical synchronization signal; or
    (ii) active low if the number of horizontal synchronization pulses counted during a low state of said vertical synchronization signal is greater than the number of horizontal synchronization pulses counted during a high state of said vertical synchronization signal.

9. The video game system of claim 7 wherein the first sensing means for sensing the active polarity of the horizontal synchronization signal comprises:
  means for timing the duration of the horizontal synchronization signal during a low state of the horizontal synchronization signal;
  means for timing the duration of the horizontal synchronization signal during a high state of the horizontal synchronization signal; and
  means for establishing the polarity of the horizontal synchronization signal to be
    (i) active high if the duration of the horizontal synchronization signal timed during a high state of said horizontal synchronization signal is greater than the duration of the horizontal synchronization signal timed during a low state of the horizontal synchronization signal; or
    (ii) active low if the duration of the horizontal synchronization signal timed during a low state of said horizontal synchronization signal is greater than the duration of the horizontal synchronization signal timed during a high state of the horizontal synchronization signal.

10. The video game system of claim 6 wherein the initialization means comprises first means for determining the y-resolution Ys of the raster pattern and second means for determining the x-resolution Xs of the raster pattern.

11. The video game system of claim 10 wherein said first means for determining the y-resolution Ys of the raster pattern comprises means for counting the number of horizontal synchronization pulses while the vertical synchronization signal is in its active polarity.

12. The video game system of claim 10 wherein said second means for determining the x-resolution Xs of the raster pattern comprises means for timing the duration of the horizontal synchronization signal while the horizontal synchronization signal is in its active polarity.

13. The video game system of claim 10 wherein said means for determining the relative x-position and the relative y-position of the field of view of the light gun positioned on the screen when the trigger is activated comprises:
  means for detecting a pulse in said electrical signal from said photosensitive transducer,
  means for counting the number of horizontal synchronization traces from the time the vertical synchronization signal transitioned to its active state until the time the pulse is detected, said number of traces being defined as Yc;
  means for timing the duration of the horizontal synchronization signal from the time the horizontal synchronization signal transitioned to its active state until the time the pulse is detected, said timing means being reset when said horizontal synchronization signal transitions to its inactive state before the pulse is detected, said timed duration being defined as Xt.

14. The video game system of claim 13 wherein said peripheral position signal comprises Xt/Xs and Yc/Ys.

15. The video game system of claim 14 wherein said computer processing means determines the X-pixel coordinate by the formula Xr*Xt/Xs, wherein Xr is the X-axis pixel resolution of the video monitor screen.

16. The video game system of claim 14 wherein said computer processing means determines the Y-pixel coordinate by the formula Yr*Yc/Ys, wherein Yr is the Y-axis pixel resolution of the video monitor screen.

17. The video game system of claim 2 wherein said video game peripheral device is shaped like a gun comprising a barrel and wherein said photosensitive device is located near the tip of the barrel.

18. A video game peripheral unit for use with a computer-based video game platform having (i) computer processing means for executing a video game program, the computer processing means generating a plurality of display frames representative of images to be displayed on a video monitor screen, and video adapter means coupled to the computer processing means for processing the display frames and generating analog display signals proportional thereto and synchronization signals correlated to the analog display signals, the analog display signals and the synchronization signals being output to a video port associated therewith, and (ii) a video monitor for processing the analog display signals and the synchronization signals to display images on a screen associated therewith; said video game peripheral unit comprising:
 a) a peripheral adapter adapted to be coupled to the video port, said peripheral adapter configured to output the analog display signals and said synchronization signals to the video monitor, said peripheral adapter further configured to output the synchronization signals to a video game peripheral device; and
 b) a video game peripheral device connected to said peripheral adapter comprising:
  i) a photosensitive transducer having a field of view, said photosensitive transducer outputting an electrical signal proportional to light sensed in its field of view,
  ii) means for receiving the synchronization signals from said peripheral adapter,
  iii) peripheral processing means for processing said electrical signal from said photosensitive device and said synchronization signals and for generating a peripheral position signal indicative of the relative position of the field of view of said photosensitive transducer on the screen; and
  iv) means for transmitting said peripheral position signal to the computer platform for further processing.

19. The video game peripheral unit of claim 18 wherein said means for transmitting said peripheral position signal transmits in serial data format.

20. The video game peripheral unit of claim 18 wherein said video game peripheral device further comprises a manually operated switch, said switch configured to provide a trigger signal to said peripheral processing means, and further wherein said peripheral position signal is transmitted to the computer platform in response to actuation of said switch.

21. The video game peripheral unit of claim 20 wherein said video game peripheral device is shaped like a gun comprising a barrel and wherein said photosensitive device is located near the tip of the barrel.

22. The video game peripheral unit of claim 20 wherein the synchronization signals comprise a horizontal synchronization signal and a vertical synchronization signal.

23. The video game peripheral unit of claim 22 wherein the peripheral position signal comprises an x-coordinate and a y-coordinate.

24. The video game peripheral unit of claim 22 wherein said peripheral processing means comprises:
 initialization means for measuring a set of initialization parameters correlated to an x-dimension of a raster pattern traced on the video monitor screen and a y-dimension of said raster pattern;
 means for sensing an activation of a trigger signal; and
 means for determining the relative x-position and the relative y-position of the field of view of the light gun positioned on the screen when the trigger is activated.

25. The video game peripheral unit of claim 24 wherein said initialization means comprises:
 first means for sensing the active polarity of the horizontal synchronization signal; and
 second means for sensing the active polarity of the vertical synchronization signal.

26. The video game peripheral unit of claim 25 wherein the second sensing means for sensing the active polarity of the vertical synchronization signal comprises:
 means for counting the number of horizontal synchronization pulses during a low state of said vertical synchronization signal;
 means for counting the number of horizontal synchronization pulses during a high state of said vertical synchronization signal; and
 means for establishing the polarity of the vertical synchronization signal to be
  (iii) active high if the number of horizontal synchronization pulses counted during a high state of said vertical synchronization signal is greater than the number of horizontal synchronization pulses counted during a low state of said vertical synchronization signal; or
  (iv) active low if the number of horizontal synchronization pulses counted during a low state of said vertical synchronization signal is greater than the number of horizontal synchronization pulses counted during a high state of said vertical synchronization signal.

27. The video game peripheral unit of claim 25 wherein the first sensing means for sensing the active polarity of the horizontal synchronization signal comprises:
 means for timing the duration of the horizontal synchronization signal during a low state of the horizontal synchronization signal;
 means for timing the duration of the horizontal synchronization signal during a high state of the horizontal synchronization signal; and
 means for establishing the polarity of the horizontal synchronization signal to be
  (iii) active high if the duration of the horizontal synchronization signal timed during a high state of said horizontal synchronization signal is greater than the duration of the horizontal synchronization signal timed during a low state of the horizontal synchronization signal; or
  (iv) active low if the duration of the horizontal synchronization signal timed during a low state of said horizontal synchronization signal is greater than the duration of the horizontal synchronization signal timed during a high state of the horizontal synchronization signal.

28. The video game peripheral unit of claim 24 wherein the initialization means comprises first means for determining the y-resolution Ys of the raster pattern and second means for determining the x-resolution Xs of the raster pattern.

29. The video game peripheral unit of claim 28 wherein said first means for determining the y-resolution Ys of the raster pattern comprises means for counting the number of horizontal synchronization pulses while the vertical synchronization signal is in its active polarity.

30. The video game peripheral unit of claim 28 wherein said second means for determining the x-resolution Xs of the raster pattern comprises means for timing the duration of the horizontal synchronization signal while the horizontal synchronization signal is in its active polarity.

31. The video game peripheral unit of claim 28 wherein said means f or determining the relative x-position and the relative y-position of the field of view of the light gun positioned on the screen when the trigger is activated comprises:
  means for detecting a pulse in said electrical signal from said photosensitive transducer,
  means for counting the number of horizontal synchronization traces from the time the vertical synchronization signal transitioned to its active state until the time the pulse is detected, said number of traces being defined as Yc;
  means for timing the duration of the horizontal synchronization signal from the time the horizontal synchronization signal transitioned to its active state until the time the pulse is detected, said timing means being reset when said horizontal synchronization signal transitions to its inactive state before the pulse is detected, said timed duration being defined as Xt.

32. The video game peripheral unit of claim 31 wherein said peripheral position signal comprises Xt/Xs and Yc/Ys.

33. A video game system comprising:
  a) a personal computer comprising
    i) computer processing means for executing a video game program, said computer processing means generating a plurality of display frames representative of images to be displayed on a video monitor screen;
    ii) video adapter means coupled to said computer processing means for processing said display frames and generating analog display signals proportional thereto and synchronization signals correlated to said analog display signals, said analog display signals and said synchronization signals being output to a video port associated therewith;
  b) a peripheral adapter external to said personal computer and coupled to said video port, said peripheral adapter configured to output said analog display signals and said synchronization signals to a video monitor;
  c) a video monitor coupled to said peripheral adapter for processing said analog display signals and said synchronization signals to display images on a screen associated therewith; and
  d) a video game peripheral device connected to said peripheral adapter and comprising a
    photosensitive transducer having a field of view, said photosensitive transducer outputting to said peripheral adapter an electrical signal proportional to light sensed in its field of view;
  wherein said peripheral adapter further comprises
    i) peripheral processing means for processing said electrical signal from said photosensitive device and said synchronization signals and for generating a peripheral position signal indicative of the relative position of the field of view of said photosensitive transducer on said screen; and
    ii) means for transmitting said peripheral position signal to an input port on said computer means for further processing.

34. The video game system of claim 33 wherein said means for transmitting said peripheral position signal transmits in serial data format.

35. The video game system of claim 33 wherein said video game peripheral device further comprises a manually operated switch, said switch configured to provide a trigger signal to said peripheral processing means, and further wherein said peripheral position signal is transmitted to said computer means in response to actuation of said switch.

36. The video game system of claim 35 wherein said video game peripheral device is shaped like a gun comprising a barrel and wherein said photosensitive device is located near the tip of the barrel.

37. The video game system of claim 35 wherein said synchronization signals comprise a horizontal synchronization signal and a vertical synchronization signal.

38. The video game system of claim 37 wherein said peripheral position signal comprises an x-coordinate and a y-coordinate.

39. The video game system of claim 37 wherein said peripheral processing means comprises:
  initialization means for measuring a set of initialization parameters correlated to an x-dimension of a raster pattern traced on said video monitor screen and a y-dimension of said raster pattern;
  means for sensing an activation of a trigger signal; and
  means for determining the relative x-position and the relative y-position of the field of view of the light gun positioned on the screen when the trigger is activated.

40. The video game system of claim 39 wherein said initialization means comprises:
  first means for sensing the active polarity of the horizontal synchronization signal; and
  second means for sensing the active polarity of the vertical synchronization signal.

41. The video game system of claim 40 wherein the second sensing means for sensing the active polarity of the vertical synchronization signal comprises:
  means for counting the number of horizontal synchronization pulses during a low state of said vertical synchronization signal;
  means for counting the number of horizontal synchronization pulses during a high state of said vertical synchronization signal; and
  means for establishing the polarity of the vertical synchronization signal to be
    (v) active high if the number of horizontal synchronization pulses counted during a high state of said vertical synchronization signal is greater than the number of horizontal synchronization pulses counted during a low state of said vertical synchronization signal; or
    (vi) active low if the number of horizontal synchronization pulses counted during a low state of said vertical synchronization signal is greater than the number of horizontal synchronization pulses counted during a high state of said vertical synchronization signal.

42. The video game system of claim 40 wherein the first sensing means for sensing the active polarity of the horizontal synchronization signal comprises:

means for timing the duration of the horizontal synchronization signal during a low state of the horizontal synchronization signal;

means for timing the duration of the horizontal synchronization signal during a high state of the horizontal synchronization signal; and means for establishing the polarity of the horizontal synchronization signal to be
   (v) active high if the duration of the horizontal synchronization signal timed during a high state of said horizontal synchronization signal is greater than the duration of the horizontal synchronization signal timed during a low state of the horizontal synchronization signal; or
   (vi) active low if the duration of the horizontal synchronization signal timed during a low state of said horizontal synchronization signal is greater than the duration of the horizontal synchronization signal timed during a high state of the horizontal synchronization signal.

43. The video game system of claim 39 wherein the initialization means comprises first means for determining the y-resolution Ys of the raster pattern and second means for determining the x-resolution Xs of the raster pattern.

44. The video game system of claim 43 wherein said first means for determining the y-resolution Ys of the raster pattern comprises means for counting the number of horizontal synchronization pulses while the vertical synchronization signal is in its active polarity.

45. The video game system of claim 43 wherein said second means for determining the x-resolution Xs of the raster pattern comprises means for timing the duration of the horizontal synchronization signal while the horizontal synchronization signal is in its active polarity.

46. The video game system of claim 43 wherein said means for determining the relative x-position and the relative y-position of the field of view of the light gun positioned on the screen when the trigger is activated comprises:

means for detecting a pulse in said electrical signal from said photosensitive transducer, means for counting the number of horizontal synchronization traces from the time the vertical synchronization signal transitioned to its active state until the time the pulse is detected, said number of traces being defined as Yc;

means for timing the duration of the horizontal synchronization signal from the time the horizontal synchronization signal transitioned to its active state until the time the pulse is detected, said timing means being reset when said horizontal synchronization signal transitions to its inactive state before the pulse is detected, said timed duration being defined as Xt.

47. The video game system of claim 37 wherein said peripheral position signal comprises Xt/Xs and Yc/Ys.

48. The video game system of claim 38 wherein said computer processing means determines the X-pixel coordinate by the formula Xr*Xt/Xs, wherein Xr is the X-axis pixel resolution of the video monitor screen.

49. The video game system of claim 47 wherein said computer processing means determines the Y-pixel coordinate by the formula Yr*Yc/Ys, wherein Yr is the Y-axis pixel resolution of the video monitor screen.

50. A video game peripheral adapter for use with a computer-based video game platform having (i) computer processing means for executing a video game program, the computer processing means generating a plurality of display frames representative of images to be displayed on a video monitor screen, and video adapter means coupled to the computer processing means for processing the display frames and generating analog display signals proportional thereto and synchronization signals correlated to the analog display signals, the analog display signals and the synchronization signals being output to a video port associated therewith, (ii) a video monitor for processing the analog display signals and the synchronization signals to display images on a screen associated therewith, and (iii) a video game peripheral device including a photosensitive transducer having a field of view and outputting an electrical signal proportional to light sensed in its field of view; wherein:

said peripheral adapter is adapted to be coupled to the video port, said peripheral adapter is configured to output the analog display signals and the synchronization signals to the video monitor, and wherein said peripheral adapter comprises:
   a) peripheral processing means for processing the electrical signal from the photosensitive device and the synchronization signals and for generating a peripheral position signal indicative of the relative position of the field of view of the photosensitive transducer on the screen; and
   b) means for transmitting said peripheral position signal to the computer platform for further processing.

51. The video game peripheral adapter of claim 50 wherein said means for transmitting said peripheral position signal transmits in serial data format.

52. The video game peripheral adapter of claim 50 wherein said video game peripheral device further comprises a manually operated switch, said switch configured to provide a trigger signal to said peripheral processing means, and further wherein said peripheral position signal is transmitted to the computer platform in response to actuation of said switch.

53. The video game peripheral adapter of claim 52 wherein the synchronization signals comprise a horizontal synchronization signal and a vertical synchronization signal.

54. The video game peripheral adapter of claim 53 wherein the peripheral position signal comprises an x-coordinate and a y-coordinate.

55. The video game peripheral adapter of claim 53 wherein said peripheral processing means comprises:

initialization means for measuring a set of initialization parameters correlated to an x-dimension of a raster pattern traced on the video monitor screen and a y-dimension of said raster pattern;

means for sensing an activation of a trigger signal; and means for determining the relative x-position and the relative y-position of the field of view of the light gun positioned on the screen when the trigger is activated.

56. The video game peripheral adapter of claim 55 wherein said initialization means comprises:

first means for sensing the active polarity of the horizontal synchronization signal; and second means for sensing the active polarity of the vertical synchronization signal.

57. The video game peripheral adapter of claim 56 wherein the second sensing means for sensing the active polarity of the vertical synchronization signal comprises:

means for counting the number of horizontal synchronization pulses during a low state of said vertical synchronization signal;

means for counting the number of h horizontal synchronization pulses during a high state of said vertical synchronization signal; and means for establishing the polarity of the vertical synchronization signal to be (vii) a active high if the number of horizontal synchronization pulses counted during a high state of said vertical synchronization signal is greater than the number of horizontal synchronization pulses counted during a low state of said vertical synchronization signal; or (viii) active low if the number of horizontal synchronization pulses counted during a low state of said vertical synchronization signal is greater than the number of horizontal synchronization pulses counted during a high state of said vertical synchronization signal.

58. The video game peripheral adapter of claim 56 wherein the first sensing means for sensing the active polarity of the horizontal synchronization signal comprises:

means for timing the duration of the horizontal synchronization signal during a low state of the horizontal synchronization signal;

means for timing the duration of the horizontal synchronization signal during a high state of the horizontal synchronization signal; and means for establishing the polarity of the horizontal synchronization signal to be (vii) active high if the duration of the horizontal synchronization signal timed during a high state of said horizontal synchronization signal is greater than the duration of the horizontal synchronization signal timed during a low state of the horizontal synchronization signal; or (viii) active low if the duration of the horizontal synchronization signal timed during a low state of said horizontal synchronization signal is greater than the duration of the horizontal synchronization signal timed during a high state of the horizontal synchronization signal.

59. The video game peripheral adapter of claim 55 wherein the initialization means comprises first means for determining the y-resolution Ys of the raster pattern and second means for determining the x-resolution Xs of the raster pattern.

60. The video game peripheral adapter of claim 59 wherein said first means for determining the y-resolution Ys of the raster pattern comprises means for counting the number of horizontal synchronization pulses while the vertical synchronization signal is in its active polarity.

61. The video game peripheral adapter of claim 59 wherein said second means for determining the x-resolution Xs of the raster pattern comprises means for timing the duration of the horizontal synchronization signal while the horizontal synchronization signal is in its active polarity.

62. The video game peripheral adapter of claim 59 wherein said means for determining the relative x-position and the relative y-position of the field of view of the light gun positioned on the screen when the trigger is activated comprises:

means for detecting a pulse in said electrical signal from said photosensitive transducer, means for counting the number of horizontal synchronization traces from the time the vertical synchronization signal transitioned to its active state until the time the pulse is detected, said number of traces being defined as Yc;

means for timing the duration of the horizontal synchronization signal from the time the horizontal synchronization signal transitioned to its active state until the time the pulse is detected, said timing means being reset when said horizontal synchronization signal transitions to its inactive state before the pulse is detected, said timed duration being defined as Xt.

63. The video game peripheral adapter of claim 53 wherein said peripheral position signal comprises Xt/Xs and Yc/Ys.

\* \* \* \* \*